(12) United States Patent
Watanabe et al.

(10) Patent No.: US 9,543,594 B2
(45) Date of Patent: Jan. 10, 2017

(54) METHOD OF MANUFACTURING METAL SEPARATOR FOR FUEL CELL

(75) Inventors: Yasuhiro Watanabe, Wako (JP); Masaaki Sakano, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 361 days.

(21) Appl. No.: 13/541,673

(22) Filed: Jul. 4, 2012

(65) Prior Publication Data

US 2013/0014377 A1 Jan. 17, 2013

(30) Foreign Application Priority Data

Jul. 14, 2011 (JP) ................. 2011-155430

(51) Int. Cl.
*H01M 4/90* (2006.01)
*H01M 4/86* (2006.01)
(Continued)

(52) U.S. Cl.
CPC ......... *H01M 8/0247* (2013.01); *H01M 8/0267* (2013.01); *H01M 8/0271* (2013.01); *H01M 8/1004* (2013.01); *B29C 43/18* (2013.01); *B29K 2021/00* (2013.01); *F16J 15/328* (2013.01); *H01M 4/8605* (2013.01); *H01M 4/9066* (2013.01); *Y02E 60/50* (2013.01); *Y02E 60/521* (2013.01); *Y02E 60/525* (2013.01); *Y02P 70/56* (2015.11); *Y10T 29/4998* (2015.01); *Y10T 29/49982* (2015.01); *Y10T 29/49984* (2015.01)

(58) Field of Classification Search
CPC ... F16J 15/328; H01M 8/1213; H01M 4/9066; H01M 8/1004; H01M 4/8605; H01M 8/0247; H01M 8/0267; H01M 8/0271; Y02E 60/521; Y02E 60/525; Y02E 60/50; B29K 2021/00; B29C 43/18; Y02P 70/56; Y10T 29/4998; Y10T 29/49982; Y10T 29/49984
USPC .................. 29/527.1; 429/482, 471, 535
IPC ...................................... Y02P 70/56
See application file for complete search history.

(56) References Cited

U.S. PATENT DOCUMENTS 6,280,870 B1 * 8/2001 Eisman et al. ............... 429/456
6,468,682 B1 * 10/2002 Fuglevand et al. .......... 429/413
(Continued)

FOREIGN PATENT DOCUMENTS

JP 2002-305006 10/2002
JP 2010-055994 3/2010
(Continued)

OTHER PUBLICATIONS

JP 2010055994 EPO English Machine Translation; Fuel Cell and Method for Manufacturing Metallic Separator; pp. 1-9.*
(Continued)

*Primary Examiner* — Christopher Besler
*Assistant Examiner* — Bayan Salone
(74) *Attorney, Agent, or Firm* — Mori & Ward, LLP (57) ABSTRACT

A method of manufacturing a metal separator for a fuel cell includes providing an opening in a metal plate which is to be a part of the metal separator for the fuel cell, integrally molding a sealing member on both sides of an outer peripheral edge of the metal plate to cover the opening, and trimming the sealing member to remove a covering portion of the sealing member that covers the opening and to provide a fluid communication hole, at least one of a fuel gas, an oxidant gas, and a cooling medium being to pass through the fluid communication hole in the fuel cell.

23 Claims, 10 Drawing Sheets

(51) Int. Cl.
  *H01M 8/02* (2016.01)
  *H01M 8/10* (2016.01)
  *B29C 43/18* (2006.01)
  *B29K 21/00* (2006.01)
  *F16J 15/32* (2016.01)

(56) References Cited

U.S. PATENT DOCUMENTS

| | | | |
|---|---|---|---|
| 6,566,001 B2 * | 5/2003 | Yosida et al. | 429/413 |
| 6,692,860 B2 * | 2/2004 | Inoue et al. | 429/481 |
| 6,761,991 B2 * | 7/2004 | Frisch et al. | 429/469 |
| 6,783,883 B1 * | 8/2004 | Koschany | 429/456 |
| 7,014,939 B2 * | 3/2006 | Suenaga et al. | 429/465 |
| 7,178,374 B2 * | 2/2007 | Enjoji et al. | 72/312 |
| 7,201,987 B2 * | 4/2007 | Sugita et al. | 429/481 |
| 7,267,902 B2 * | 9/2007 | Brunk et al. | 429/481 |
| 7,393,607 B2 * | 7/2008 | Mohri et al. | 429/458 |
| 7,488,550 B2 * | 2/2009 | Tanaka et al. | 429/483 |
| 7,553,576 B2 * | 6/2009 | Kimura et al. | 429/433 |
| 7,727,658 B2 * | 6/2010 | Enjoji et al. | 429/453 |
| 7,883,814 B2 * | 2/2011 | Watanabe et al. | 429/460 |
| 8,007,950 B2 * | 8/2011 | Sakano et al. | 429/452 |
| 8,053,125 B2 * | 11/2011 | Nakagawa et al. | 429/434 |
| 8,097,379 B2 * | 1/2012 | Suenaga et al. | 429/460 |
| 8,153,333 B2 * | 4/2012 | Sugita et al. | 429/534 |
| 8,232,015 B2 * | 7/2012 | Osenar et al. | 429/434 |
| 8,298,716 B2 * | 10/2012 | Sasaoka | 429/460 |
| 8,304,140 B2 * | 11/2012 | Sugiura et al. | 429/514 |
| 8,637,204 B2 * | 1/2014 | Suenaga et al. | 429/463 |
| 2001/0005557 A1 * | 6/2001 | Yosida et al. | 429/32 |
| 2002/0117780 A1 * | 8/2002 | Inoue et al. | 264/299 |
| 2002/0122970 A1 * | 9/2002 | Inoue et al. | 429/35 |
| 2003/0003342 A1 * | 1/2003 | Sugita et al. | 429/35 |
| 2003/0041444 A1 * | 3/2003 | Debe et al. | 29/623.1 |
| 2005/0100776 A1 * | 5/2005 | Brunk et al. | 429/35 |
| 2005/0118484 A1 * | 6/2005 | Kawachi et al. | 429/35 |
| 2005/0142414 A1 * | 6/2005 | Kimura et al. | 429/34 |
| 2005/0188740 A1 * | 9/2005 | Enjoji et al. | 72/404 |
| 2007/0020504 A1 * | 1/2007 | Sugita et al. | 429/38 |
| 2007/0231662 A1 * | 10/2007 | Goto et al. | 429/35 |
| 2008/0160377 A1 * | 7/2008 | Osenar et al. | 429/32 |
| 2009/0023035 A1 * | 1/2009 | Sasaoka | 429/30 |
| 2009/0148748 A1 * | 6/2009 | Okonogi et al. | 429/35 |
| 2009/0148749 A1 * | 6/2009 | Okonogi et al. | 429/36 |
| 2009/0148750 A1 * | 6/2009 | Okonogi et al. | 429/36 |
| 2010/0028742 A1 * | 2/2010 | Jeon et al. | 429/26 |
| 2010/0035121 A1 * | 2/2010 | Shibata et al. | 429/34 |
| 2010/0035122 A1 * | 2/2010 | Yamamoto et al. | 429/34 |
| 2010/0119905 A1 * | 5/2010 | Kikuchi et al. | 429/26 |

FOREIGN PATENT DOCUMENTS

| | | | |
|---|---|---|---|
| JP | 2010055994 A | * | 3/2010 |
| JP | 2010-212001 | | 9/2010 |
| JP | 2010212001 A | * | 9/2010 |
| JP | 2011-028885 | | 2/2011 |
| JP | 2011028885 A | * | 2/2011 |
| JP | 2011-165570 | | 8/2011 |

OTHER PUBLICATIONS

Japanese Office Action for corresponding JP Application No. 2011-155430, Jul. 25, 2014.

* cited by examiner

BACKGROUND ART

METHOD OF MANUFACTURING METAL SEPARATOR FOR FUEL CELL

CROSS-REFERENCE TO RELATED APPLICATIONS

The present application claims priority under 35 U.S.C. §119 to Japanese Patent Application No. 2011-155430, filed Jul. 14, 2011, entitled "Manufacturing Method of Metal Separator for Fuel Cell." The contents of this application are incorporated herein by reference in their entirety.

BACKGROUND OF THE INVENTION

Field of the Invention

The present disclosure relates to a method of manufacturing a metal separator for a fuel cell.

Discussion of the Background

For example, a solid polymer electrolyte membrane formed of a polymer ion exchange membrane is used for a solid polymer electrolyte fuel cell. The fuel cell has a power generation cell in which a membrane electrode assembly (MEA) is sandwiched between separators (bipolar plates), the membrane electrode assembly being formed by disposing an anode-side electrode and a cathode-side electrode including an electrode catalyst and a porous carbon on both sides of the solid polymer electrolyte membrane, respectively. A fuel cell including stacked layers of a plurality of power generation cells is used, for example, as an in-vehicle fuel cell stack.

In the fuel cell, a passage for passing a fuel gas (hereinafter also referred to as a reactant gas) is formed in the surface of the separator that faces the anode-side electrode, while a passage for passing an oxidant gas (hereinafter also referred to as a reactant gas) is formed in the surface of the separator that faces the cathode-side electrode. In addition, a passage for passing a cooling medium between separators is formed for each power generation cell or for a predetermined number of power generation cells.

Thus, it is necessary to securely seal between the passages so that a fuel gas, an oxidant gas, and a cooling medium are not mixed with each other, and also necessary to prevent intrusion of a foreign substance into the passages and a short circuit between the separators. For this reason, a metal separator in which a sealing member is integrally molded on both sides of the outer peripheral edge of a metal plate is used, for example.

Figure 10:
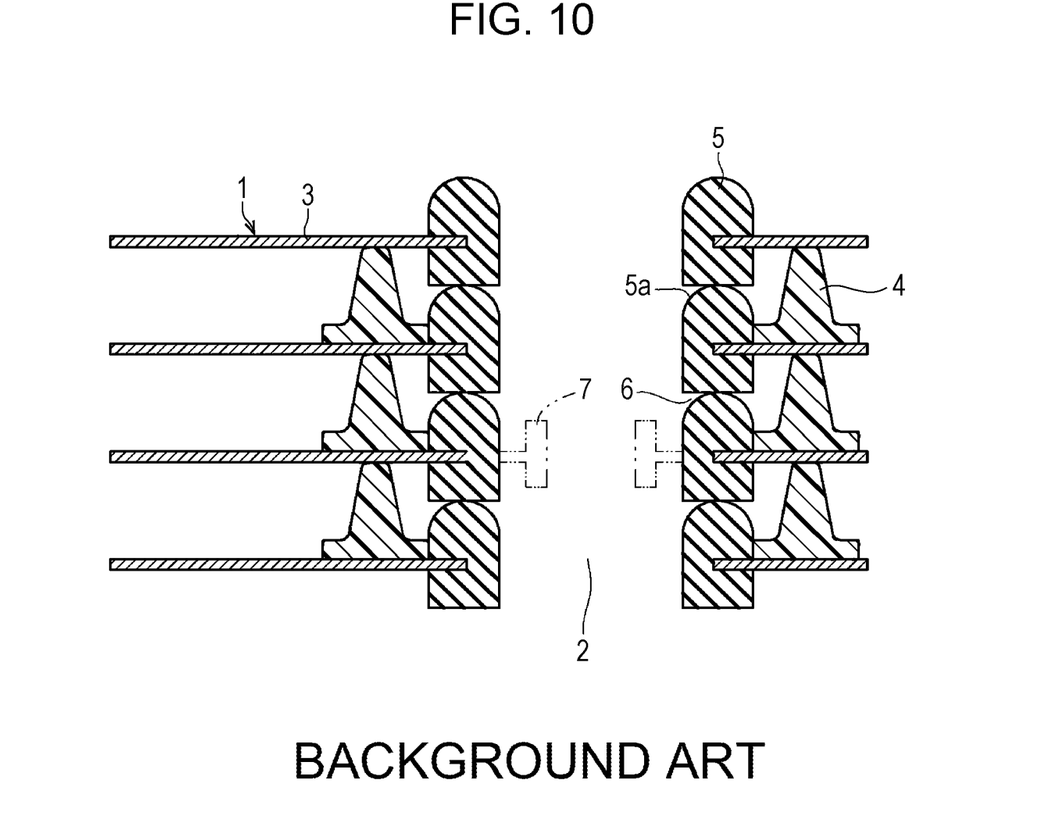
FIG. 10 is an illustrative cross-sectional view of the fuel cell in Japanese Unexamined Patent Application Publication No. 2002-305006.

For example, as disclosed in Japanese Unexamined Patent Application Publication No. 2002-305006, there is known a fuel cell in which the above type of metal separator is used, and an insulating member is provided around the periphery of each communication hole formed in the separator. Specifically, as illustrated in FIG. 10, a separator 1 and a membrane electrode assembly (not shown) are stacked alternately, and a communication hole 2 is formed in the separator 1 through in the stacking direction, for passing a reactant gas and a cooling medium.

The separator 1 is provided with a metal plate 3 composed of a stainless steel plate material or the like, and a seal member 4 is integrally molded with the metal plate 3. The separator 1 is provided with a circular insulating member 5 which surrounds the communication hole 2.

SUMMARY OF THE INVENTION

According to one aspect of the present invention, a method of manufacturing a metal separator for a fuel cell, the method includes: providing an opening in a metal plate which is to be a part of the metal separator for the fuel cell; integrally molding a sealing member on both sides of an outer peripheral edge of the metal plate to cover the opening; and trimming the sealing member to remove a covering portion of the sealing member that covers the opening and to provide a fluid communication hole, at least one of a fuel gas, an oxidant gas, and a cooling medium being to pass through the fluid communication hole in the fuel cell.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
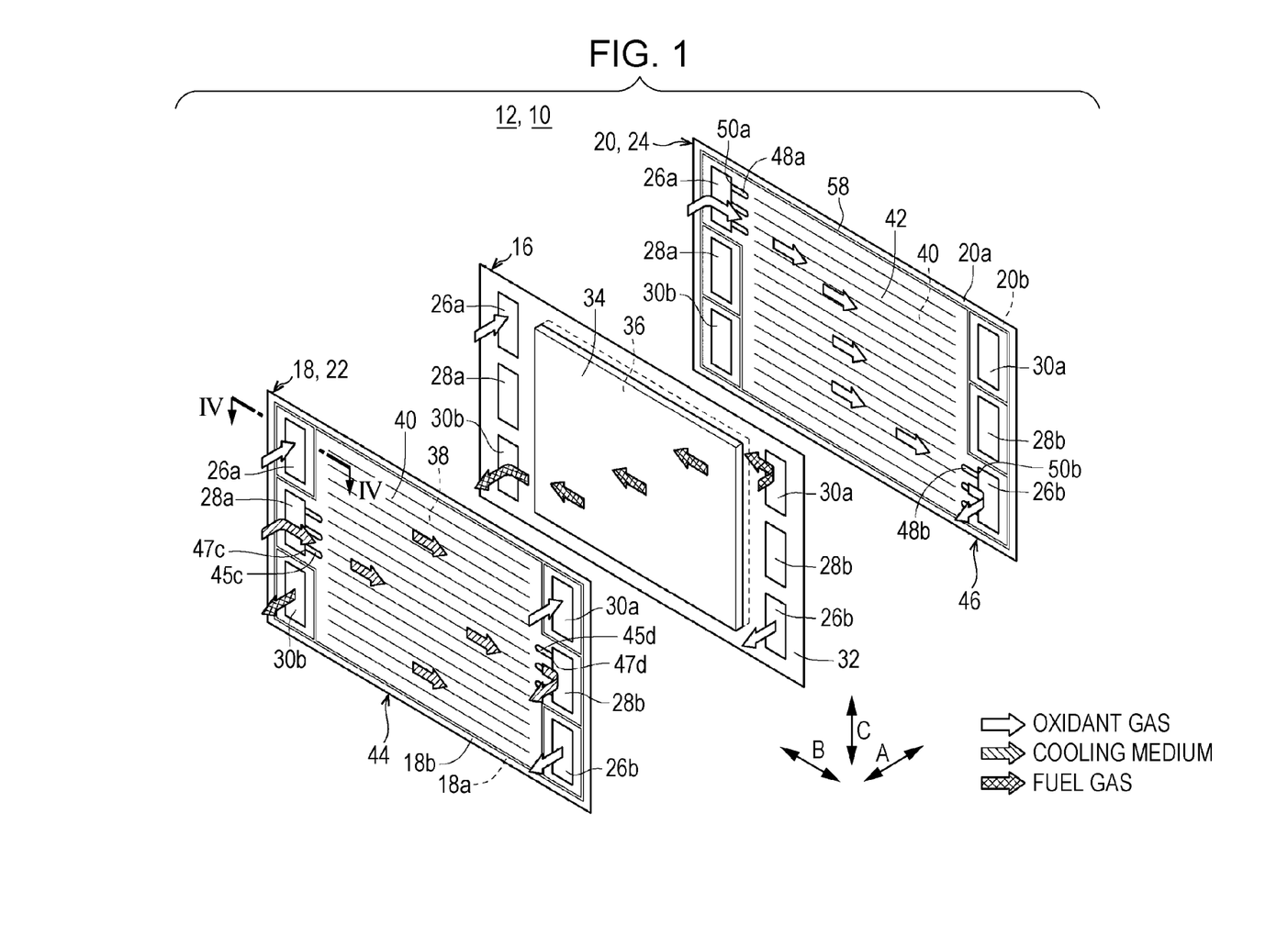
FIG. 1 is a partially exploded perspective view of a power generation cell which constitutes a fuel cell according to an embodiment of the present disclosure.
Figure 2:
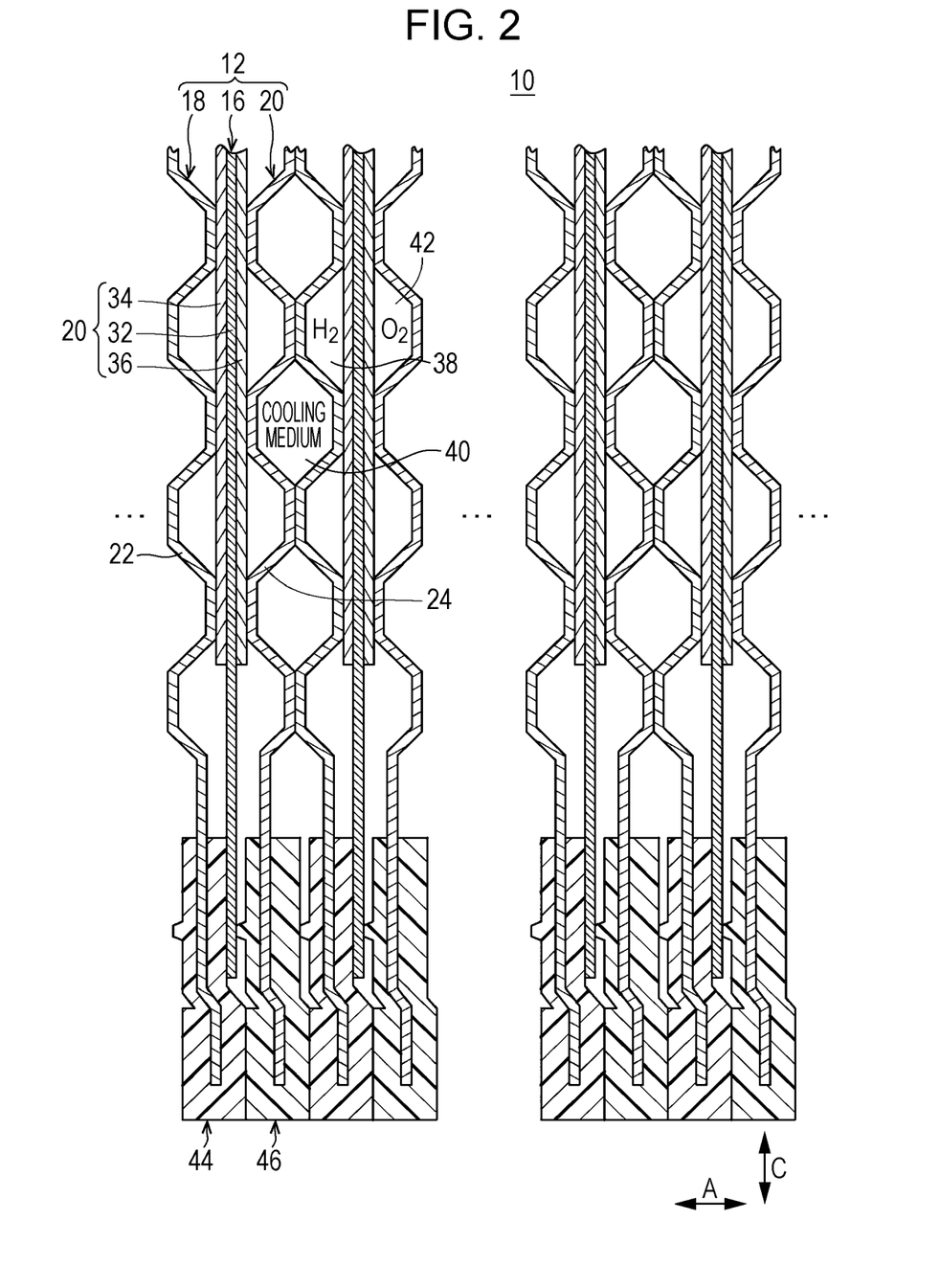
FIG. 2 is an illustrative partial cross-sectional view of the fuel cell.

As illustrated in FIGS. 1 and 2, in a fuel cell 10 to which a manufacturing method according to the embodiment of the present disclosure is applied, a plurality of power generation cells 12 are stacked in the horizontal direction (direction of an arrow A) or in the vertical direction (direction of an arrow C).

The power generation cell 12 includes a membrane electrode assembly (electrolyte electrode assembly) (MEA) 16, a first metal separator 18 and a second metal separator 20 between which the membrane electrode assembly 16 is sandwiched. The first metal separator 18 and the second metal separator 20 are provided with projected and recessed portions in cross section after press work is performed on a metal plate 22 and a metal plate 24 in a corrugated form, dimple form, or the like (see FIG. 2).

One end edge of the power generation cell 12 in the longitudinal direction (direction of an arrow B in FIG. 1) is provided with an oxidant gas supply communication hole (fluid communication hole) 26a for supplying an oxidant gas, for example, an oxygen containing gas, a cooling medium supply communication hole for supplying a cooling medium (fluid communication hole) 28a, and a fuel gas discharge communication hole (fluid communication hole) 30b for discharging a fuel gas, for example, a hydrogen containing gas that communicate with each other in the direction of the arrow A.

The other end edge of the power generation cell 12 in the longitudinal direction is provided with a fuel gas supply communication hole (fluid communication hole) 30a for supplying a fuel gas, a cooling medium discharge communication hole (fluid communication hole) 28b for discharging a cooling medium, and an oxidant gas discharge communication hole (fluid communication hole) 26b for discharging an oxidant gas that communicate with each other in the direction of the arrow A.

The membrane electrode assembly 16 includes, for example, a solid polymer electrolyte membrane 32 which is a thin perfluoro sulfonic acid membrane impregnated with water, and an anode-side electrode 34 and a cathode-side electrode 36 between which the solid polymer electrolyte membrane 32 is sandwiched.

The anode-side electrode 34 and the cathode-side electrode 36 have a gas diffusion layer which is formed of carbon paper or the like, and an electrode catalyst layer which is formed by uniformly coating the surface of the gas diffusion layer with porous carbon particles which support platinum alloy on the surfaces thereof. The electrode catalyst layer is formed on both sides of the solid polymer electrolyte membrane 32.

Figure 3:
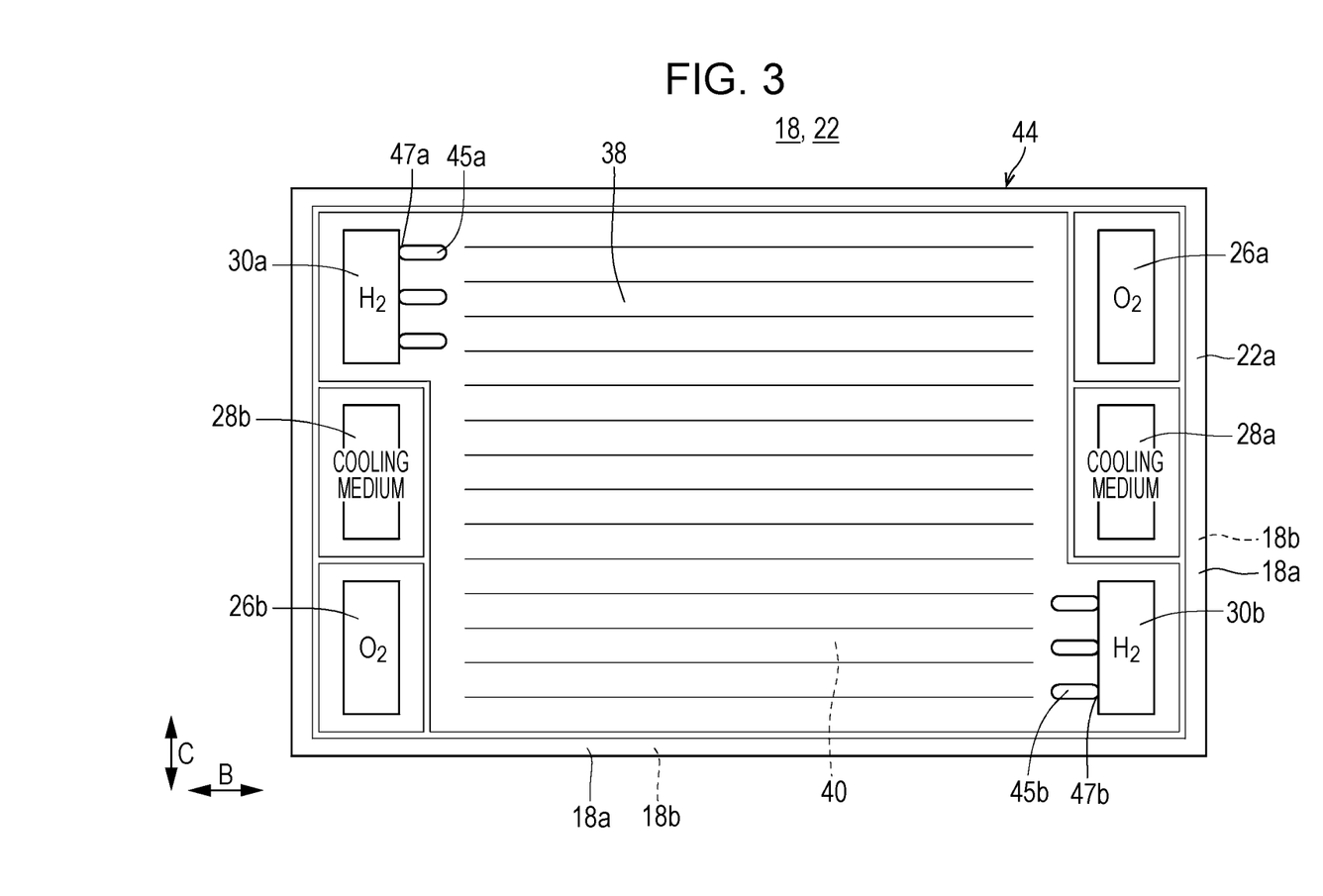
FIG. 3 is an illustrative front view of a first metal separator which constitutes the power generation cell.

As illustrated in FIG. 3, a fuel gas passage 38 is formed on a surface 18a of the first metal separator 18 that faces the membrane electrode assembly 16, the fuel gas passage 38 allowing the fuel gas supply communication hole 30a to communicate with the fuel gas discharge communication hole 30b. The fuel gas passage 38 includes, for example, a plurality of grooves (communication passages) that extend in the direction of the arrow B. As illustrated in FIG. 1, a cooling medium passage 40 is formed on a surface 18b of the first metal separator 18, the cooling medium passage 40 allowing the cooling medium supply communication hole 28a to communicate with the cooling medium discharge communication hole 28b. The cooling medium passage 40 includes a plurality of grooves (communication passages) that extend in the direction of the arrow B.

An oxidant gas passage 42 including a plurality of grooves (communication passages) that extend in the direction of the arrow B is provided on a surface 20a of the second metal separator 20 that faces the membrane electrode assembly 16. The oxidant gas passage 42 allows the oxidant gas supply communication hole 26a to communicate with the oxidant gas discharge communication hole 26b. The surface 18b of the first metal separator 18 is completely overlapped with the surface 20b of the second metal separator 20 so that the cooling medium passage 40 is integrally formed between them.

On the surfaces 18a and 18b of the first metal separator 18, a first sealing member 44 is integrally molded to surround the outer peripheral edge of the metal plate 22. As the material for first sealing member 44, a sealing material, a cushioning material, or a packing material, such as EPDM, NBR, a fluoride rubber, a silicone rubber, a fluoro silicone rubber, a butyl rubber, a natural rubber, a styrene rubber, a chloroprene or acrylic rubber is used.

As illustrated in FIG. 3, on the surface 18a, the first sealing member 44 surrounds the fuel gas supply communication hole 30a, the fuel gas discharge communication hole 30b, and the fuel gas passage 38 that are allowed to communicate each other. A plurality of projection shaped inlet bridge portions 45a are provided between the fuel gas supply communication hole 30a and the fuel gas passages 38, and a plurality of projection shaped outlet bridge portions 45b are provided between the fuel gas discharge communication hole 30b and the fuel gas passage 38.

The inlet bridge portion 45a has an arc form portion 47a at an end that faces the fuel gas supply communication hole 30a. The arc form portion 47a is set to have a large R (radius of curvature), which is greater than or equal to one half of the width dimension of the inlet bridge portion 45a.

Similarly, the outlet bridge portion 45b has an arc form portion 47b at an end that faces the fuel gas discharge communication hole 30b. The arc form portion 47b is set to have a large R, which is greater than or equal to one half of the width dimension of the outlet bridge portion 45b.

As illustrated in FIG. 1, on the surface 18b, the first sealing member 44 surrounds the cooling medium supply communication hole 28a, the cooling medium discharge communication hole 28b, and the cooling medium passage 40 that are allowed to communicate each other. A plurality of projection shaped inlet bridge portions 45c are provided between the cooling medium supply communication hole 28a and the cooling medium passage 40, and a plurality of projection shaped outlet bridge portions 45d are provided between the cooling medium discharge communication hole 28b and the cooling medium passage 40. The inlet bridge portion 45c and the outlet bridge portion 45d have arc form portions 47c and 47d at respective ends of the portions that face the cooling medium supply communication hole 28a and the cooling medium discharge communication hole 28b, respectively. The arc form portion 47c is formed so as to have R which is greater than or equal to one half of the width dimension of the inlet bridge portion 45c, and the arc form portions 47d is formed so as to have R which is greater than or equal to one half of the width dimension of the outlet bridge portion 45d.

On the surfaces 20a and 20b of the second metal separator 20, a second sealing member 46 is integrally molded to surround the outer peripheral edge of the second metal separator 20. On the surface 20a, the second sealing member 46 surrounds the oxidant gas supply communication hole 26a, the oxidant gas discharge communication hole 26b, and the oxidant gas passage 42 that are allowed to communicate each other.

A plurality of projection shaped inlet bridge portions 48a are provided between the oxidant gas supply communication hole 26a and the oxidant gas passages 42, a plurality of projection shaped outlet bridge portions 48b are provided between the oxidant gas discharge communication hole 26b and the oxidant gas passage 42.

The projection shaped inlet bridge portions 48a and the projection shaped outlet bridge portions 48b have arc form portions 50a and 50b at respective ends of the portions that face the oxidant gas supply communication hole 26a and the oxidant gas discharge communication hole 26b, respectively. The arc form portion 50a is formed so as to have R which is greater than or equal to one half of the width dimension of the inlet bridge portion 48a, and the arc form portions 50b is formed so as to have R which is greater than or equal to one half of the width dimension of the outlet bridge portion 48b.

Figure 4:
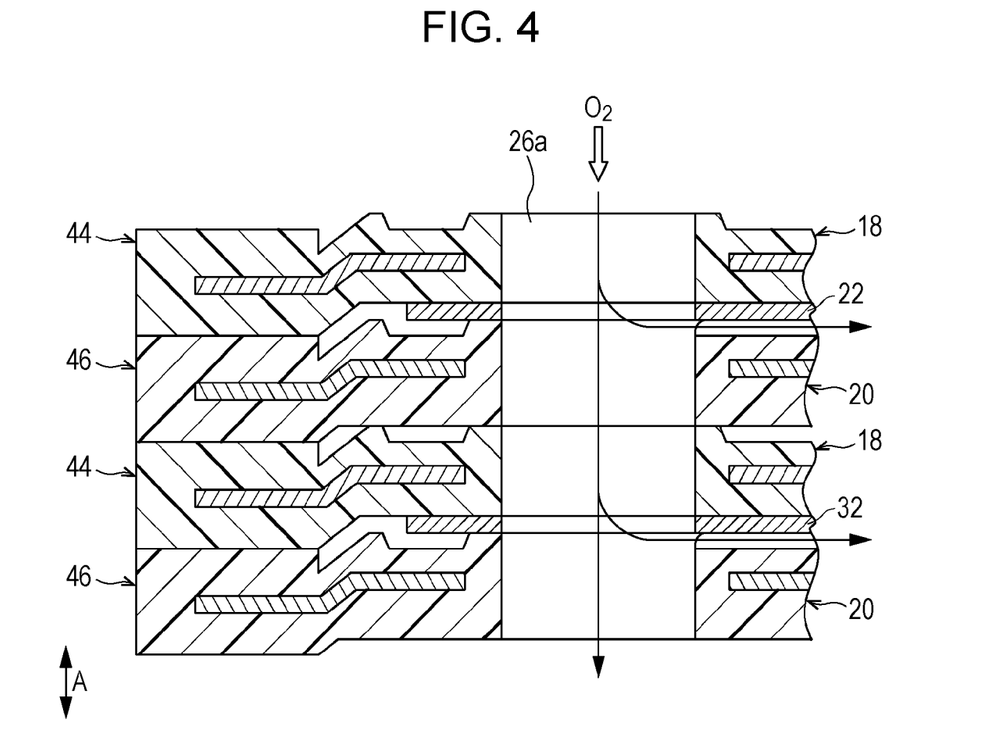
FIG. 4 is a cross-sectional view of the power generation cell taken along line IV-IV in FIG. 1.

As illustrated in FIG. 4, in the first sealing member 44 and the second sealing member 46, the peripheral end faces of the first metal separator 18 and the second metal separator 20 are trimmed, and adjacent outer peripheral edges are completely overlapped with each other so that continuous outer peripheral end face without a gap is formed.

The first sealing member 44 and the second sealing member 46 form a fluid communication hole which is continuous in the stacking direction without a gap by trimming the inner wall surfaces of the oxidant gas supply communication hole 26*a*, the oxidant gas discharge communication hole 26*b*, the cooling medium supply communication hole 28*a*, the cooling medium discharge communication hole 28*b*, the fuel gas supply communication hole 30*a*, and the fuel gas discharge communication hole 30*b*.

The solid polymer electrolyte membrane 32 does not need to be extended to the inner wall surfaces of the oxidant gas supply communication hole 26*a*, the oxidant gas discharge communication hole 26*b*, the cooling medium supply communication hole 28*a*, the cooling medium discharge communication hole 28*b*, the fuel gas supply communication hole 30*a*, and the fuel gas discharge communication hole 30*b*. The first sealing member 44 and the second sealing member 46 are in direct contact with each other.

The manufacturing process of the first metal separator 18 in the fuel cell 10 configured in the above manner is described below. Because the second metal separator 20 is manufactured in the same manner as the first metal separator 18 is manufactured, detailed description for the second metal separator 20 is omitted.

First, the metal plate 22 which constitutes the first metal separator 18 is placed on an injection molding machine (not shown), and the first sealing member 44 is injection molded into the metal plate 22.

Figure 5:
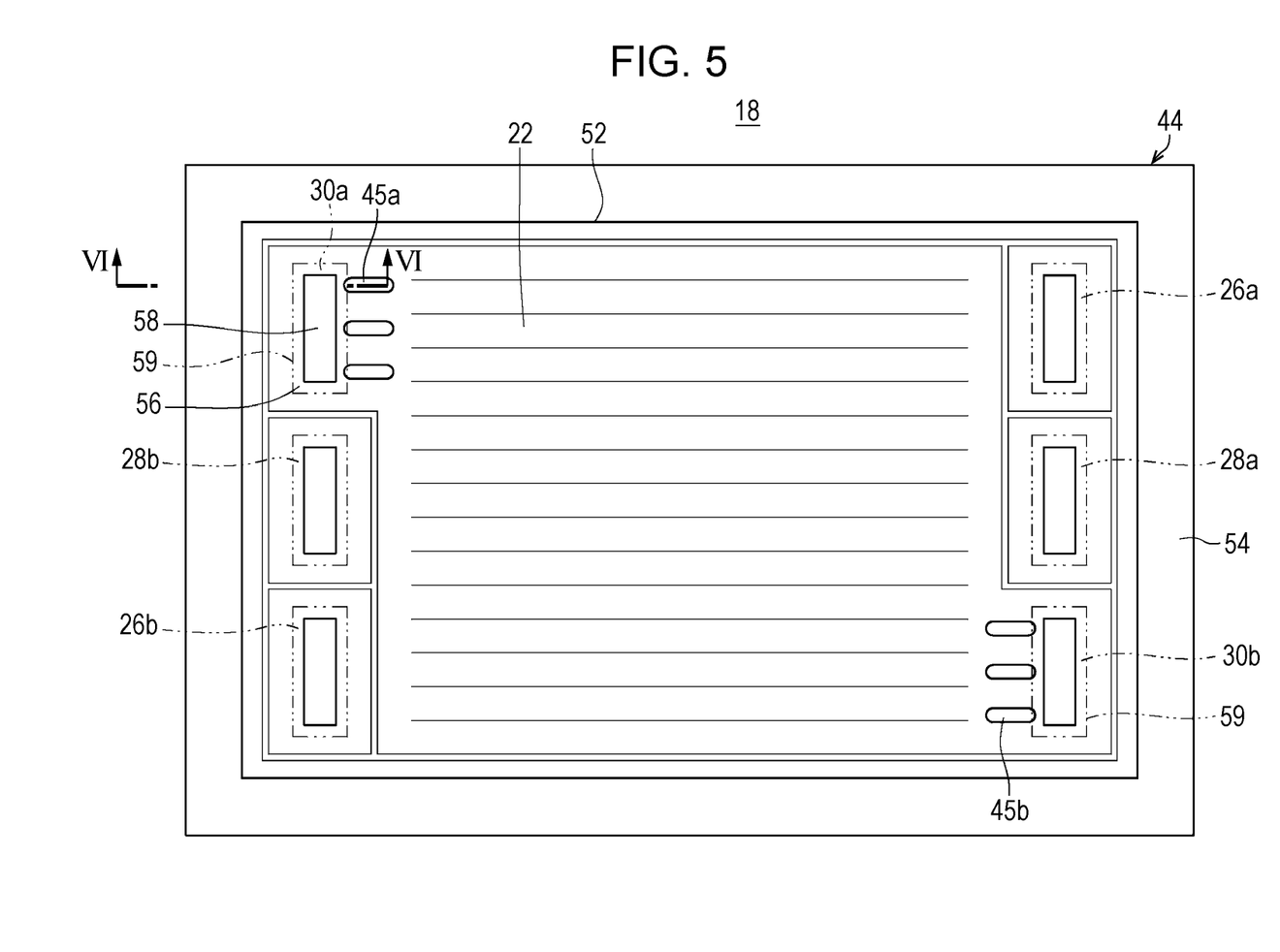
FIG. 5 is an illustrative front view of a first metal separator when a first sealing member is injection molded to the first metal separator.
Figure 6:
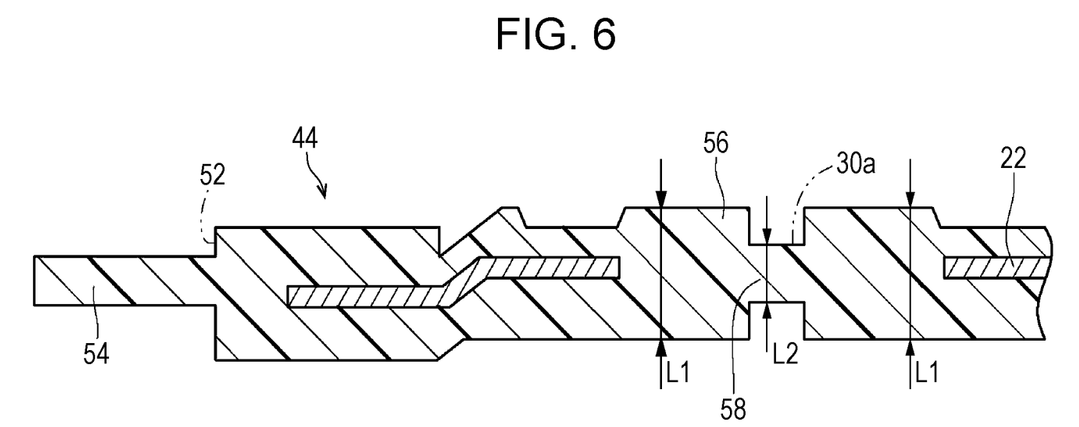
FIG. 6 is a cross-sectional view of the first metal separator taken along line VI-VI in FIG. 5.

When the first sealing member 44 is injection molded to the metal plate 22 as illustrated in FIGS. 5 and 6, an outer peripheral thin portion (overflow portion) 54 is integrally formed outside an outline trimming line 52 corresponding to the outline shape of the first metal separator 18. Within the surface of the separator, the first sealing member 44 seals the oxidant gas supply communication hole 26*a*, the oxidant gas discharge communication hole 26*b*, the cooling medium supply communication hole 28*a*, the cooling medium discharge communication hole 28*b*, the fuel gas supply communication hole 30*a*, and the fuel gas discharge communication hole 30*b*.

As illustrated in FIG. 6, the portion of the first sealing member 44 that covers the fuel gas supply communication hole 30*a* has a thick portion 56 and a thin portion 58, the thick portion 56 having a thickness L1 which is set to be equivalent to the thickness of a part of the sealing member that covers the metal plate 22, the thin portion 58 having a thickness L2 which is set to be thinner than the thick portion 56. Similarly, other fluid communication holes below each have a thin portion and a thick portion: the fuel gas discharge communication hole 30*b*, the oxidant gas supply communication hole 26*a*, the oxidant gas discharge communication hole 26*b*, the cooling medium supply communication hole 28*a*, the cooling medium discharge communication hole 28*b*.

As illustrated in FIG. 5, a plurality of inlet bridge portions 45*a* are provided in the neighborhood of the fuel gas supply communication hole 30*a*, while a plurality of outlet bridge portions 45*b* are provided in the neighborhood of the fuel gas discharge communication hole 30*b*. The inlet bridge portions 45*a* and the outlet bridge portions 45*b* show the respective arc form portions 47*a* and 47*b* partially inside a communication hole trimming line 59 the fuel gas supply communication hole 30*a* and the fuel gas discharge communication hole 30*b*.

Figure 7:
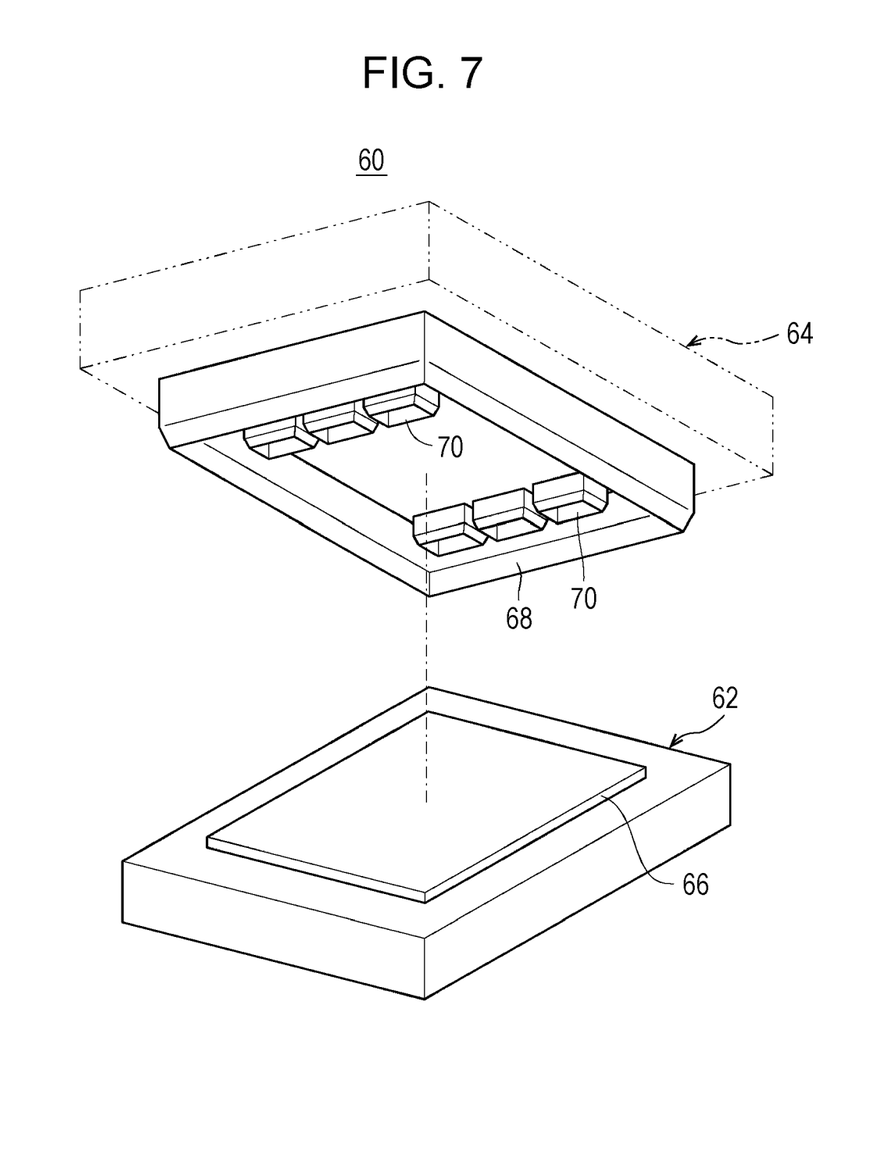
FIG. 7 is an illustrative perspective view of the main part of a processing device which performs trimming process on the first metal separator.

As illustrated in FIG. 7, a processing device 60 for performing trimming process on the first metal separator 18 is equipped with a receiving mold 62 and a blade mold 64. The receiving mold 62 is composed of, for example, an aluminum metal, and has a level difference portion 66 which corresponds to the level difference shape of the outer peripheral edge of the metal plate 22. The blade mold 64 has an outline trimming blade 68 for performing trimming process on the outline trimming line 52 of the first sealing member 44, and six communication hole trimming blades 70 for performing trimming process along the communication hole trimming line 59 of each fluid communication hole.

Figure 8:
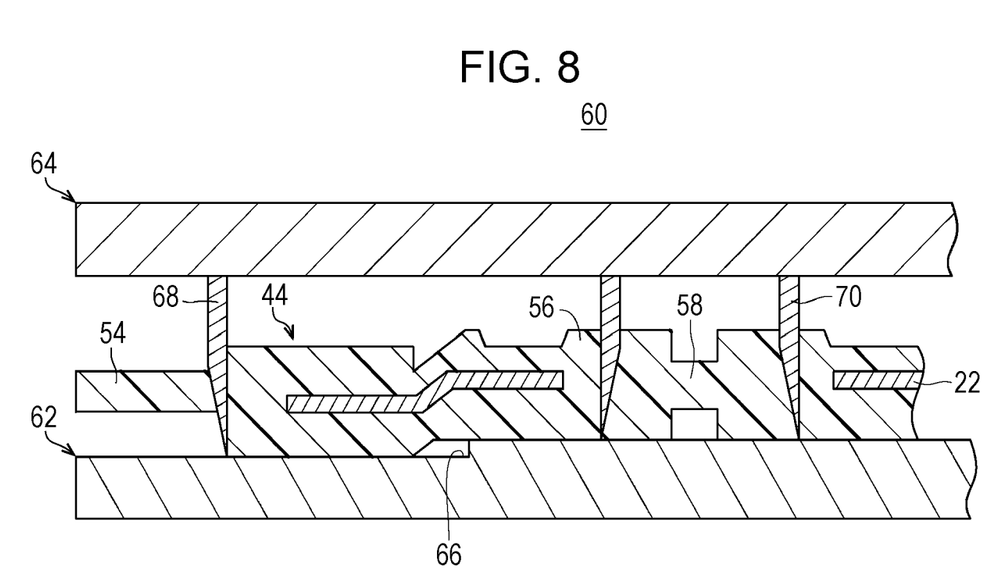
FIG. 8 is an illustrative view of the trimming process performed by the processing device.

Then, the blade mold 64 moves toward the receiving mold 62 with the first metal separator 18 without trimming disposed on the receiving mold 62. Thus, the outline trimming blade 68 trims the outer peripheral thin portion 54 along the outline trimming line 52 of the first sealing member 44. On the other hand, each communication hole trimming blade 70 trims and removes the thin portion 58 and part of the thick portion 56 along each communication hole trimming line 59 (see FIG. 8). Consequently, the first metal separator 18 is manufactured.

In this case in the present embodiment, after the first sealing member 44 is integrally molded with the metal plate 22 while covering each fluid communication hole, the portion of the first sealing member 44 that seals the fluid communication hole is removed by the trimming process along each communication hole trimming line 59. For this reason, as illustrated in FIG. 4, a burr can be prevented from being formed on the inner wall surface of the fuel gas supply communication hole 30*a*, for example, and a projected or recessed portion is not formed on the inner wall surface. Therefore, manual removal of the burr is not necessary, and the first sealing member 44 can be integrally molded with the metal plate 22 simply and inexpensively. Furthermore, the first metal separator 18 and the second metal separator 20 allow the inner wall surfaces of the fuel gas supply communication hole 30*a* to communicate each other smoothly without a projected or recessed portion on the inner wall surfaces.

Consequently, a pressure loss of the fuel gas can be reduced, and there is obtained an effect that the uneven flow distribution to each fuel cell 10 can be favorably improved. A similar effect can be obtained for the oxidant gas and the cooling medium.

Figure 9:
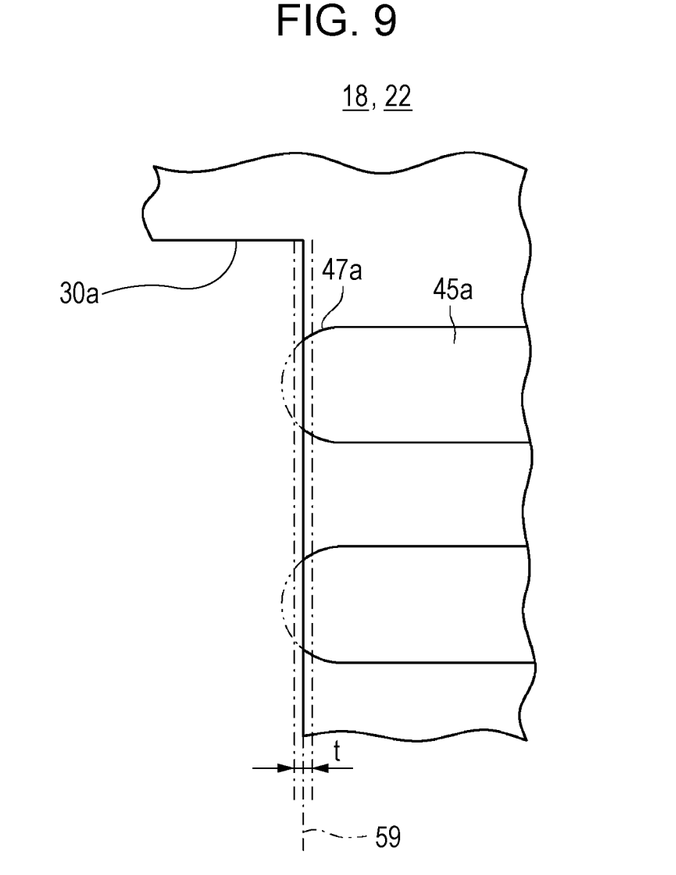
FIG. 9 is an illustrative view of an inlet buffer which is disposed in the first sealing member.

In the present embodiment, as illustrated in FIG. 9, one end of each inlet bridge portion 45*a* that faces the fuel gas supply communication hole 30*a* is provided with the arc form portion 47*a*. By setting a large radius of curvature (R) of the arc form portion 47*a*, an influence of a position error t of the communication hole trimming line 59 on a resulting shape can be reduced as much as possible.

That is to say, by using the arc form portion 47*a*, a pressure loss of the fuel gas which flows from the fuel gas supply communication hole 30*a* into the inlet bridge portion 45*a* can be effectively reduced. Therefore, an influence of the arc form portion 47*a* on a resulting shape is decreased, and the pressure loss can be effectively reduced.

In addition, the portion that covers each fluid communication hole is provided with the thin portion 58 which is to be removed by trimming. Therefore, the amount of resin material to be removed can be reduced, thereby providing a cost-effective advantage.

Next, the operation of the fuel cell 10 including the first metal separator 18, the second metal separator 20, and the membrane electrode assembly 16 is described below.

As illustrated in FIG. 1, in the fuel cell 10, an oxidant gas such as an oxygen containing gas is supplied to the oxidant gas supply communication hole 26a, while a fuel gas such as a hydrogen containing gas is supplied to the fuel gas supply communication hole 30a. In addition a cooling medium such as pure water or ethylene glycol is supplied to the cooling medium supply communication hole 28a. Therefore, in each power generation cell 12, an oxidant gas, a fuel gas, and a cooling medium are all supplied in the direction of the arrow A.

The oxidant gas is introduced from the oxidant gas supply communication hole 26a into the oxidant gas passage 42 of the second metal separator 20, and flows along the cathode-side electrode 36 of the membrane electrode assembly 16. On the other hand, the fuel gas is introduced from the fuel gas supply communication hole 30a into the fuel gas passage 38 of the first metal separator 18, and flows along the anode-side electrode 34 of the membrane electrode assembly 16.

Therefore, in each membrane electrode assembly 16, the oxidant gas supplied to the cathode-side electrode 36, and the fuel gas supplied to the anode-side electrode 34 are consumed by the electrochemical reaction in an electrode catalyst layer, and thus electric power is generated.

Next, the oxidant gas which has been supplied to the cathode-side electrode 36 and consumed flows along the oxidant gas discharge communication hole 26b. Similarly, the fuel gas which has been supplied to the anode-side electrode 34 and consumed is discharged into the fuel gas discharge communication hole 30b, and flows therethrough.

The cooling medium is introduced from the cooling medium supply communication hole 28a into the cooling medium passage 40 between the first metal separator 18 and the second metal separator 20, then flows in the direction of the arrow B. The cooling medium, after cooling the membrane electrode assembly 16, flows through the cooling medium discharge communication hole 28b, and is discharged from the fuel cell 10.

The present embodiment relates to a method of manufacturing a metal separator for a fuel cell, in which a sealing member is integrally molded on both sides of an outer peripheral edge of a metal plate, and fluid communication holes for respectively passing fluids of at least a fuel gas, an oxidant gas, and a cooling medium are provided.

The manufacturing method includes integrally molding the sealing member on both sides of the outer peripheral edge of the metal plate while covering the fluid communication hole by the sealing member; and trimming the sealing member so as to remove a portion of the sealing member that seals the fluid communication hole. Thus, a burr can be prevented from being formed on the inner wall surface of each fluid communication hole, and thus manual removal of the burr is not necessary and a projected or recessed portion is not formed on the inner wall surface.

In the manufacturing method, it is preferable that the portion of the sealing member that covers the fluid communication hole has a thick portion and a thin portion, the thick portion having a thickness which is set to be equivalent to a thickness of a part of the sealing member that covers the metal plate, the thin portion having a thickness which is set to be thinner than the thick portion, and the thin portion and part of the thick portion are removed in the trimming. Accordingly, the sealing member can be integrally molded with the metal plate simply and inexpensively, and the inner wall surfaces of the fluid communication holes of the metal separators can communicate each other smoothly without a projected or recessed portion on the inner wall surfaces.

Consequently, a pressure loss of the reactant gas and the cooling medium can be reduced, and the uneven flow distribution to each fuel cell can be favorably increased.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a metal separator for a fuel cell, the method comprising:
   providing an opening in a metal plate which is to be a part of the metal separator for the fuel cell;
   integrally molding a sealing member on both sides of an outer peripheral edge of the metal plate to cover the opening to form a covering portion that covers the opening, the covering portion including a thick portion and a thin portion; and
   trimming the sealing member at the thick portion of the covering portion to remove the covering portion of the sealing member and to provide a fluid communication hole by removing the thin portion and only a part of the thick portion, at least one of a fuel gas, an oxidant gas, and a cooling medium being to pass through the fluid communication hole in the fuel cell, the trimming preventing the formation of a burr on the fluid communication hole,
   wherein the thick portion is a continuous portion of the covering portion.

2. The method of manufacturing a metal separator for a fuel cell according to claim 1,
   wherein the thick portion has a thickness which is substantially equivalent to a thickness of a part of the sealing member that covers the metal plate, and the thin portion has a thickness which is thinner than a thickness of the thick portion.

3. The method of manufacturing a metal separator for a fuel cell according to claim 1,
   wherein the molding of the sealing member includes molding integrally the sealing member on the both sides of the outer peripheral edge of the metal plate to provide a bridge portion having a convex shape, and
   wherein the trimming of the sealing member includes removing the covering portion and a part of the bridge portion to provide the fluid communication hole.

4. The method of manufacturing a metal separator for a fuel cell according to claim 3,
   wherein the metal separator includes communication passages through which at least one of a fuel gas, an oxidant gas, and a cooling medium is to pass in the fuel cell,
   wherein the bridge portion includes a first end and a second end and extends along a direction in which the communication passages extend, the first end being closer to the covering portion than the second end, and
   wherein the trimming of the sealing member includes removing the covering portion and at least part of the first end to provide the fluid communication hole.

5. The method of manufacturing a metal separator for a fuel cell according to claim 1,
   wherein the fluid communication hole is provided in the opening of the metal plate.

6. A method comprising:
   providing an opening in a metal plate of a metal separator for a fuel cell;
   integrally molding a sealing member on opposite surfaces of an outer peripheral edge of the metal plate so as to cover the opening to form a covering portion that covers the opening, the covering portion including a thick portion and a thin portion; and trimming the sealing member at the thick portion of the covering portion to remove the covering portion of the sealing member and to provide a fluid communication hole that extends through the opening of the metal plate of the metal separator by removing the thin portion and only a part of the thick portion, wherein a remaining portion of the sealing member covers peripheral edges of the opening of the metal plate of the metal separator, the trimming preventing the formation of a burr on the fluid communication hole, wherein the thick portion is a continuous portion of the covering portion.

7. The method according to claim 6,
wherein the thick portion has a thickness which is substantially equivalent to a thickness of a part of the sealing member that covers the metal plate, and the thin portion has a thickness which is thinner than a thickness of the thick portion.

8. The method according to claim 6,
wherein the molding of the sealing member includes molding integrally the sealing member on the opposite surfaces of the outer peripheral edge of the metal plate to provide a bridge portion having a convex shape, and
wherein the trimming of the sealing member includes removing the covering portion and a part of the bridge portion to provide the fluid communication hole.

9. The method according to claim 8,
wherein the metal separator includes communication passages through which at least one of a fuel gas, an oxidant gas, and a cooling medium is to pass in the fuel cell,
wherein the bridge portion includes a first end and a second end and extends along a direction in which the communication passages extend, the first end being closer to the covering portion than the second end, and
wherein the trimming of the sealing member includes removing the covering portion and at least part of the first end to provide the fluid communication hole.

10. The method according to claim 6,
wherein the fluid communication hole is provided in the opening of the metal plate.

11. The method of manufacturing a metal separator for a fuel cell according to claim 1,
wherein the thick portion is disposed about opposite sides of the thin portion prior to trimming the sealing member.

12. The method according to claim 1, wherein trimming the sealing member further comprises:
trimming an outer peripheral portion of the sealing member disposed in an exterior direction relative to the outer peripheral edge of the metal plate.

13. The method according to claim 6,
wherein the thick portion is disposed about opposite sides of the thin portion prior to trimming the sealing member.

14. The method according to claim 6, wherein trimming the sealing member further comprises:
trimming an outer peripheral portion of the sealing member disposed in an exterior direction relative to the outer peripheral edge of the metal plate.

15. The method according to claim 1, wherein the trimming is performed at an upper surface of the thick portion of the covering portion.

16. A method of manufacturing a metal separator for a fuel cell, the method comprising:
providing an opening in a metal plate which is to be a part of the metal separator for the fuel cell;
integrally molding a sealing member on both sides of an outer peripheral edge of the metal plate to cover the opening to form a covering portion that covers the opening, the covering portion including a thick portion and a thin portion; and
trimming the sealing member by applying a trimming blade to the thick portion of the covering portion to remove the covering portion of the sealing member and to provide a fluid communication hole by removing the thin portion and only a part of the thick portion, at least one of a fuel gas, an oxidant gas, and a cooling medium being to pass through the fluid communication hole in the fuel cell,
wherein the thick portion is a continuous portion of the covering portion.

17. The method of manufacturing a metal separator for a fuel cell according to claim 16,
wherein the thick portion has a thickness which is substantially equivalent to a thickness of a part of the sealing member that covers the metal plate, and the thin portion has a thickness which is thinner than a thickness of the thick portion.

18. The method of manufacturing a metal separator for a fuel cell according to claim 16,
wherein the molding of the sealing member includes molding integrally the sealing member on the both sides of the outer peripheral edge of the metal plate to provide a bridge portion having a convex shape, and
wherein the trimming of the sealing member includes removing the covering portion and a part of the bridge portion to provide the fluid communication hole.

19. The method of manufacturing a metal separator for a fuel cell according to claim 16, wherein the trimming is performed by applying the trimming blade to an upper surface of the thick portion of the covering portion.

20. The method of manufacturing a metal separator for a fuel cell according to claim 18,
wherein the metal separator includes communication passages through which at least one of a fuel gas, an oxidant gas, and a cooling medium is to pass in the fuel cell,
wherein the bridge portion includes a first end and a second end and extends along a direction in which the communication passages extend, the first end being closer to the covering portion than the second end, and
wherein the trimming of the sealing member includes removing the covering portion and at least part of the first end to provide the fluid communication hole.

21. The method of manufacturing a metal separator for a fuel cell according to claim 1,
wherein the part of the thick portion continuously extends so as to surround the thin portion and trimming the sealing member at the thick portion removes the part of the thick portion.

22. The method according to claim 6,
wherein the part of the thick portion continuously extends so as to surround the thin portion and trimming the sealing member at the thick portion removes the part of the thick portion.

23. The method of manufacturing a metal separator for a fuel cell according to claim 16, wherein the step of trimming the sealing member is performed by trimming the sealing member at the thick portion without contacting the thin portion with the trimming blade.

* * * * *